(12) United States Patent
Yamamoto et al.

(10) Patent No.: US 8,145,123 B2
(45) Date of Patent: Mar. 27, 2012

(54) SATELLITE COMMUNICATION SYSTEM AND METHOD FOR DIVIDING THE COVERAGE AREA THEREOF

(75) Inventors: Shinichi Yamamoto, Tokyo (JP); Tamotsu Nishino, Tokyo (JP); Izuru Naito, Tokyo (JP); Yoshihiko Konishi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/127,475

(22) PCT Filed: Nov. 10, 2009

(86) PCT No.: PCT/JP2009/069107
§ 371 (c)(1),
(2), (4) Date: May 4, 2011

(87) PCT Pub. No.: WO2010/058714
PCT Pub. Date: May 27, 2010

(65) Prior Publication Data
US 2011/0212681 A1 Sep. 1, 2011

(30) Foreign Application Priority Data
Nov. 19, 2008 (JP) .................... 2008-295495

(51) Int. Cl.
*H04H 20/71* (2008.01)
(52) U.S. Cl. .............. 455/3.01; 455/13.3; 455/429
(58) Field of Classification Search .......... 455/3.01, 455/11.1, 12.1, 13.1, 13.3, 427, 429
See application file for complete search history.

(56) References Cited

U.S. PATENT DOCUMENTS

| | | | |
|---|---|---|---|
| 5,736,959 A * | 4/1998 | Patterson et al. | 342/354 |
| 5,754,139 A | 5/1998 | Turcotte et al. | |
| 6,088,416 A | 7/2000 | Perahia et al. | |
| 6,157,621 A * | 12/2000 | Brown et al. | 370/310 |
| 6,421,528 B1 * | 7/2002 | Rosen et al. | 455/67.16 |
| 6,799,014 B2 * | 9/2004 | Rosen et al. | 455/12.1 |
| 7,376,417 B2 * | 5/2008 | Walsh et al. | 455/427 |
| 2005/0220207 A1 | 10/2005 | Perlman et al. | |

FOREIGN PATENT DOCUMENTS

| | | |
|---|---|---|
| JP | 10 145275 | 5/1998 |
| JP | 2007 537623 | 12/2007 |

OTHER PUBLICATIONS

International Search Report issued Jan. 19, 2010 in PCT/JP09/069107 filed Nov. 10, 2009.

* cited by examiner

*Primary Examiner* — Nhan Le
(74) *Attorney, Agent, or Firm* — Oblon, Spivak, McClelland, Maier & Neustadt, L.L.P.

(57) ABSTRACT

A beam forming apparatus of a satellite is configured to: define a perimeter of a coverage area, and define a coordinate grid of a polar coordinate system so as to divide the coverage area into a plurality of small areas; calculate coordinates of borders between basic cells in a Cartesian coordinate system, the basic cells being shaped into regular hexagons arranged to be in contact with one another along their sides and at their vertices or into circles circumscribing the regular hexagons; define a plurality of new cells by converting, through coordinate transformation, the coordinates of the borders between the basic cells in the Cartesian coordinate system into coordinates of borders in the polar coordinate system; and set amplitudes and phases to the plurality of antenna devices that are suitable to form a plurality of beams in respective directions of the plurality of new cells.

12 Claims, 15 Drawing Sheets

SATELLITE COMMUNICATION SYSTEM AND METHOD FOR DIVIDING THE COVERAGE AREA THEREOF

TECHNICAL FIELD

The present invention relates to a satellite communication system having its coverage area as a communication target area in which cells of different sizes or shapes are present in a mixed manner and a frequency reuse pattern is established.

BACKGROUND ART

A conventional coverage dividing method divides a coverage area into, in the ideal form, regular hexagon cells and uses different frequencies or the like for adjacent cells, to thereby reduce co-channel interference and adjacent channel interference (see, for example, PTL 1).

Another method has also been proposed which uses a frequency shifted by orthogonal frequency separation to reduce interference and enhance spectral efficiency (see, for example, PTL 2).

CITATION LIST

Patent Literature
[PTL 1] JP 2002-44000 A
[PTL 2] JP 2000-36783 A

SUMMARY OF INVENTION

Technical Problem

The above-mentioned conventional method of dividing a coverage area in a frequency reuse pattern divides a coverage area into cells that share the same regular hexagon shape. When the cell size or shape is variable from place to place, cells do not maintain an adjacency relation, which gives rise to a problem for the method in that the frequency reuse pattern cannot be established.

The present invention has been made to solve the above-mentioned problem, and an object of the present invention is therefore to provide a satellite communication system employing a coverage area dividing method with which a frequency reuse pattern is established in a coverage area that contains a mixture of cells of different sizes or shapes.

Solution to Problem

According to the present invention, there is provided a satellite communication system for communications between a satellite and a plurality of earth stations, in which the satellite includes: a beam forming apparatus for forming a plurality of beams in respective directions of cells into which a coverage area as a communication target area is divided; and a plurality of antenna devices connected to the beam forming apparatus, and in which the beam forming apparatus is configured to: define a perimeter of the coverage area, and define a coordinate grid of a second coordinate system so as to divide the coverage area into a plurality of small areas; calculate coordinates of borders between basic cells in a first coordinate system, the basic cells being shaped into regular hexagons arranged to be in contact with one another along their sides and at their vertices or into circles circumscribing the regular hexagons; define a plurality of new cells by converting, through coordinate transformation, the coordinates of the borders between the basic cells in the first coordinate system into coordinates of borders in the second coordinate system; and set amplitudes and phases to the plurality of antenna devices that are suitable to form the plurality of beams in respective directions of the plurality of new cells.

Advantageous Effects of Invention

According to the satellite communication system of the present invention, the frequency reuse pattern is established in the coverage area that contains a mixture of cells of different sizes or shapes.

DESCRIPTION OF EMBODIMENTS

Embodiment 1 to Embodiment 6 of the present invention are described below.

EMBODIMENT 1

Figure 1:
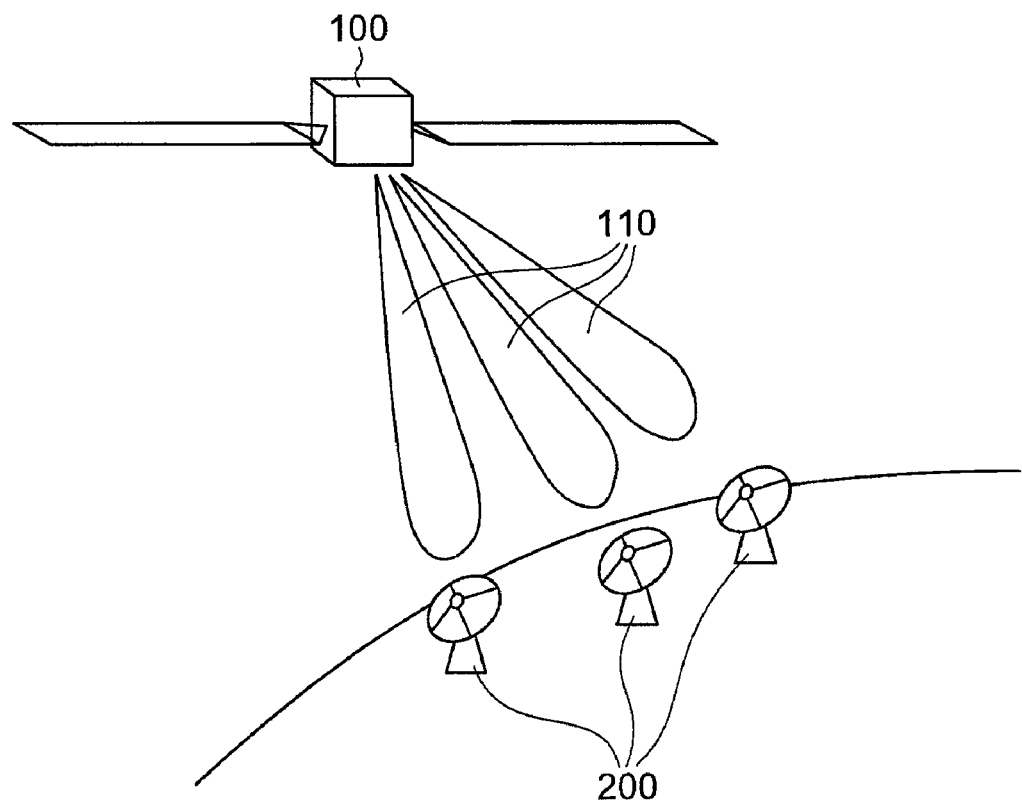
FIG. 1 A diagram illustrating a satellite communication system according to Embodiment 1 of the present invention.

A satellite communication system according to Embodiment 1 of the present invention is described with reference to FIGS. 1 to 7. FIG. 1 is a diagram illustrating the satellite communication system according to Embodiment 1 of the present invention. Throughout the drawings, the same reference symbols represent the same or equivalent components.

In FIG. 1, the satellite communication system according to Embodiment 1 of the present invention includes a satellite (artificial satellite) 100 and a plurality of earth stations (receiving stations on the Earth) 200.

The satellite 100 transmits beams 110 toward the plurality of earth stations 200. The satellite 100 receives in the same manner and beams are transmitted from the earth stations 200. The plurality of earth stations 200 are located physically apart from one another on the Earth, and in different directions when viewed from the satellite 100. The satellite 100 can vary the emission direction of the beams 110 to communicate (with the earth stations 200 that are located in the plurality of directions) simultaneously via the plurality of beams 110. This is called multibeam satellite communications.

Figure 2:
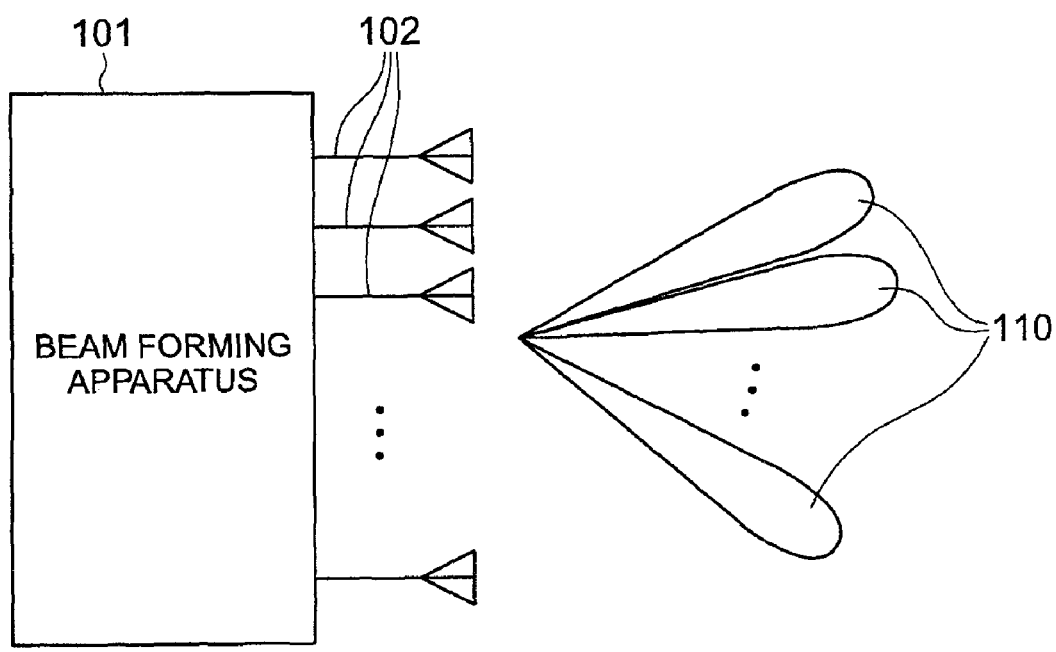
FIG. 2 A diagram illustrating a configuration of a satellite of the satellite communication system according to Embodiment 1 of the present invention.

FIG. 2 is a diagram illustrating a configuration of the satellite of the satellite communication system according to Embodiment 1 of the present invention.

In FIG. 2, the satellite 100 includes, among others, a beam forming apparatus 101 for forming a plurality of beams in the respective directions of cells into which a coverage area as a communication target area is divided, and a plurality of antenna devices 102.

The beam forming apparatus 101 forms the beams 110 in desired directions by setting suitable amplitudes and phases to the plurality of antenna devices 102. The shape of the beams 110 can be changed by changing the settings of the beam forming apparatus 101. While the beams 110 illustrated in FIG. 2 are emitted directly, the beams 110 exiting the antenna devices 102 may instead be transmitted to the earth via a reflecting mirror (parabolic mirror or the like).

An operation of the beam forming apparatus included in the satellite of the satellite communication system according to Embodiment 1 is described next with reference to the drawing.

Figure 3:
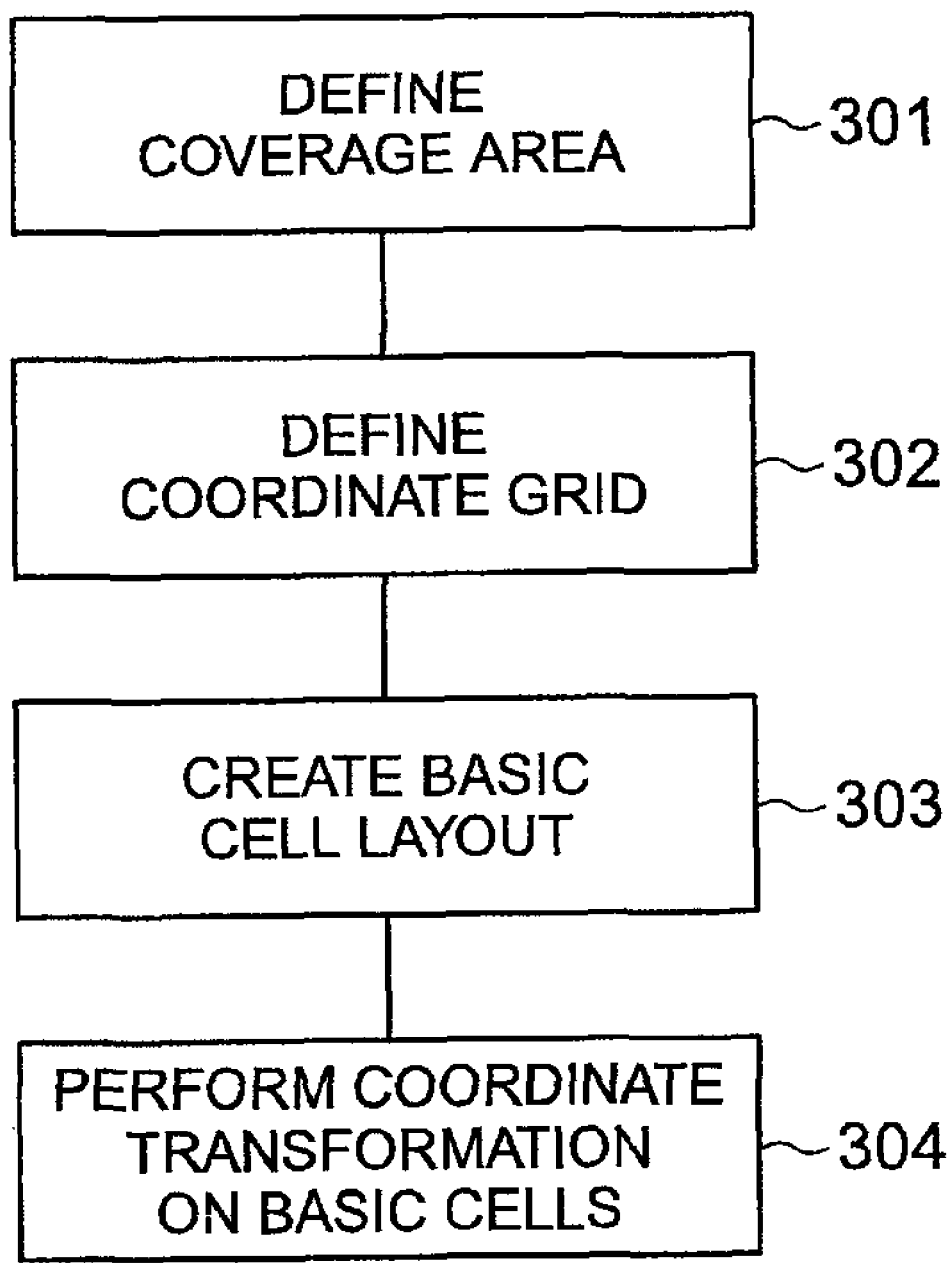
FIG. 3 A flow chart illustrating an operation (coverage area dividing method) of a beam forming apparatus, which is included in the satellite of the satellite communication system according to Embodiment 1 of the present invention.

FIG. 3 is a flow chart illustrating the operation (coverage area dividing method) of the beam forming apparatus included in the satellite of the satellite communication system according to Embodiment 1 of the present invention.

First, in Step 301, the beam forming apparatus 101 defines the perimeter of a coverage area to be divided. The perimeter may be defined by, for example, points on the ground expressed in longitude and latitude, or by elevation angles and azimuths viewed from the antennas. The coordinates (longitude and latitude or elevation angle and azimuth) of the perimeter are determined at regular intervals to define the perimeter and thereby identify the coverage area.

Next, in Step 302, a coordinate grid is defined so as to divide the coverage area into small areas. For example, a two-dimensional coordinate system such as a polar coordinate system can be defined basically by two parameters, and a trajectory obtained by fixing one of the parameters and changing the other parameter alone forms a coordinate grid (e.g., half-lines and circles). In the case where the interval of the coordinate grid is constant, coordinate transformation does not change the cell layout except for overall expansion or shrinkage. Coordinate transformation brings about a conversion to small cells when the coordinate grid has a narrow interval, and a conversion to large cells when the coordinate grid has a wide interval. In the case where the interval of the coordinate grid is narrow in some places and wide in other places, a shift from small cells to large cells is made in stages.

Next, in Step 303, basic cells are created by arranging regular hexagons in, for example, a Cartesian coordinate system so that the regular hexagons are in contact with one another along their sides and at their vertices. At this time, the regular hexagons may be substituted with circles that circumscribe the regular hexagons. In this case, circular cells are laid out in an equilateral triangle pattern and partially overlap with one another. The overall aspect ratio of the basic regular hexagon cell layout or the basic circular cell layout may be changed, or the entire layout may be slanted. A coordinate system that defines basic cells may be made up of, for example, points on the ground expressed in longitude and latitude, or elevation angles and azimuths viewed from the antennas. Defining cells is generally easy with a coordinate system that is similar to the Cartesian coordinate system (x-y coordinate system). In the Cartesian coordinate system, for example, the coordinates of the border between one basic cell and its adjacent basic cell are calculated.

Lastly, in Step 304, the coordinate values of the borders between basic cells are converted by coordinate transformation into the coordinate values of the borders in a coordinate system that has the defined coordinate grid, to thereby define new cells (converted cells). Throughout the coordinate transformation, which changes coordinates in a continuous manner, the cells maintain the adjacency relation of the basic cell layout that is the pattern in Step 303 prior to the transformation. If the number of times frequencies are reused and the cell adjacency distance (nearest cells, next nearest cells, next to next nearest cells, and the like) have been chosen appropriately for the basic cell layout, the original frequency reuse pattern can be used as is because the adjacency relation of the basic cell layout is maintained. The type of coordinate transformation to be adopted can be chosen arbitrarily, and one suitable for the objective cell layout shape may be used.

The beam forming apparatus 101 then sets amplitudes and phases to the plurality of antennas 102 that are suitable to form a plurality of beams in the respective directions of the plurality of new cells (converted cells).

The order of executing the steps in the flow chart of FIG. 3 is an example and may be changed. For instance, basic cells may be created first (Step 303), followed by the defining of a coordinate grid (Step 302) and coordinate transformation (Step 304), which in turn are followed by the defining of a coverage area (Step 301) and the cutting out of a part of the post-transformation cell layout as cells within the coverage area.

Usually, a limited number of users (or a limited total communication capacity) are assigned to each cell separately, and it is desirable to assign approximately the same number of users (or approximately the same total communication traffic) to every cell. For example, cells are desirably made small for urban or other areas where communication density is very high whereas cells are made large for sea and other areas where communication density is low. The coverage dividing method of the present invention is capable of varying the cell size to suit the communication traffic.

When a communication system is built with the use of a basic cell layout, a circular beam (or beam having a shape that resembles a circle) is used to cover each cell and, because all cells have the same size, the gain for covering a cell, too, is approximately the same for every cell. In the case of a small cell, the transmission power of a beam used to cover the cell is allowed to focus on a narrow area, which means that the gain of the relevant antenna can be set large and produces an effect in that a high communication traffic density can be handled.

Figure 4:
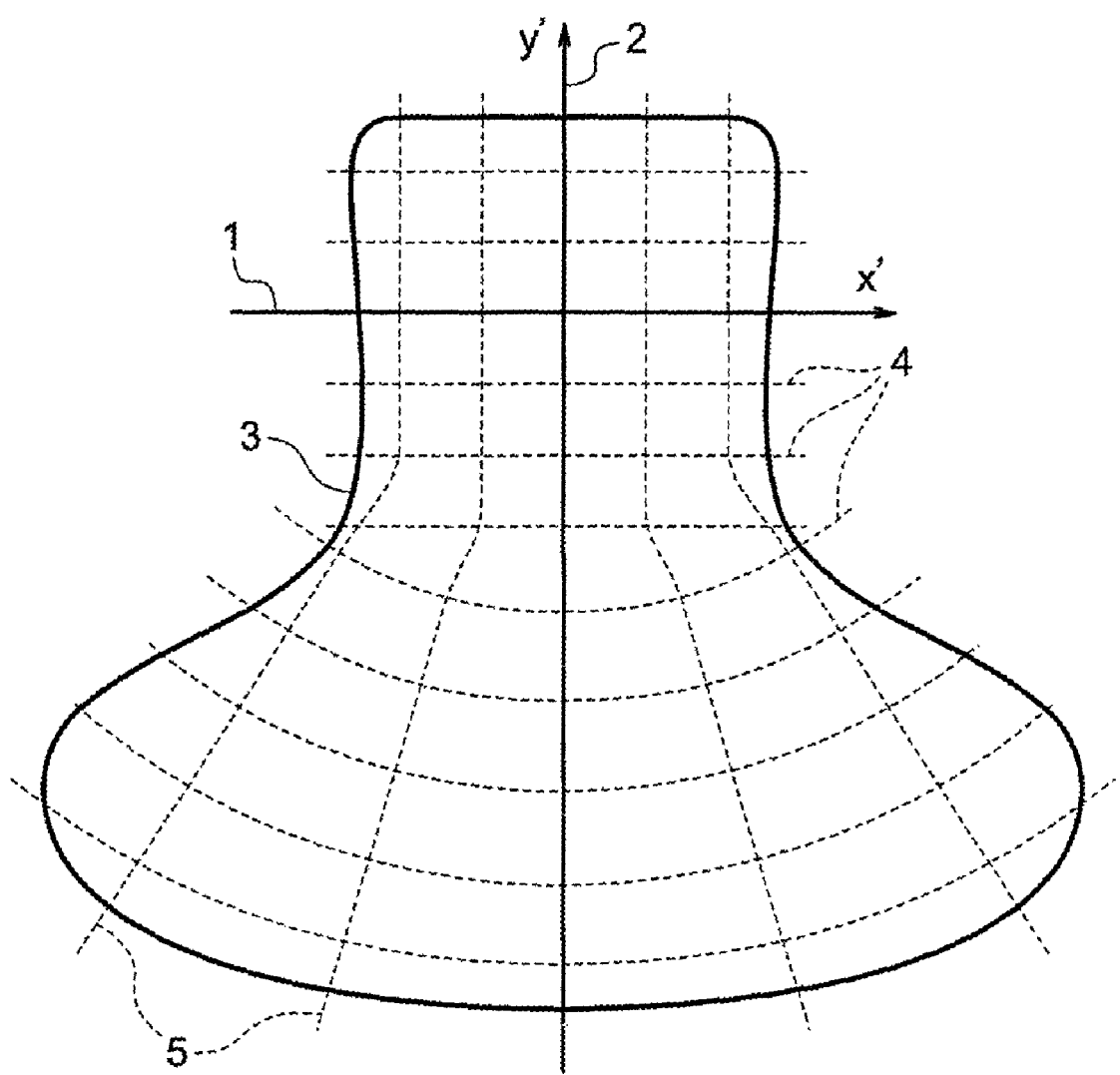
FIG. 4 A diagram illustrating an example of a coverage area and coordinate grid of the satellite communication system according to Embodiment 1 of the present invention.
Figure 5:
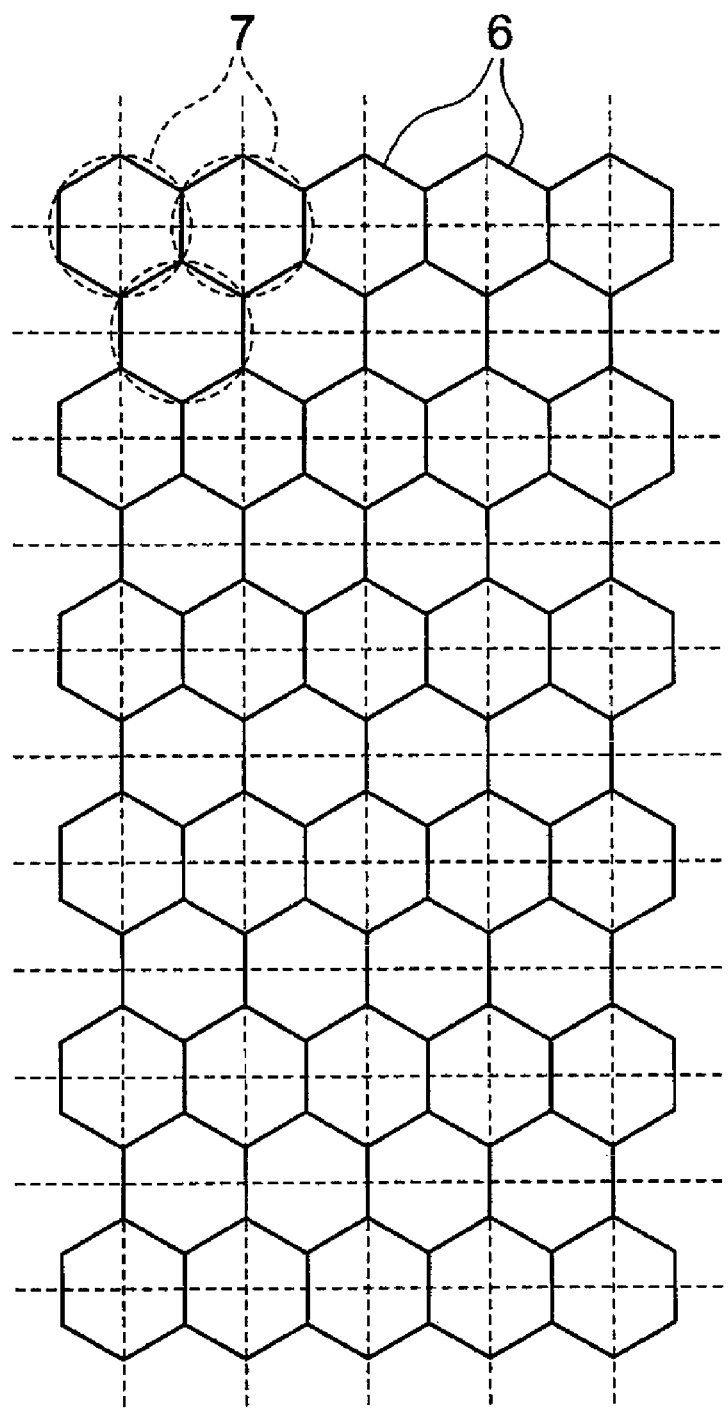
FIG. 5 A diagram illustrating a basic regular hexagon cell layout of the satellite communication system according to Embodiment 1 of the present invention.
Figure 6:
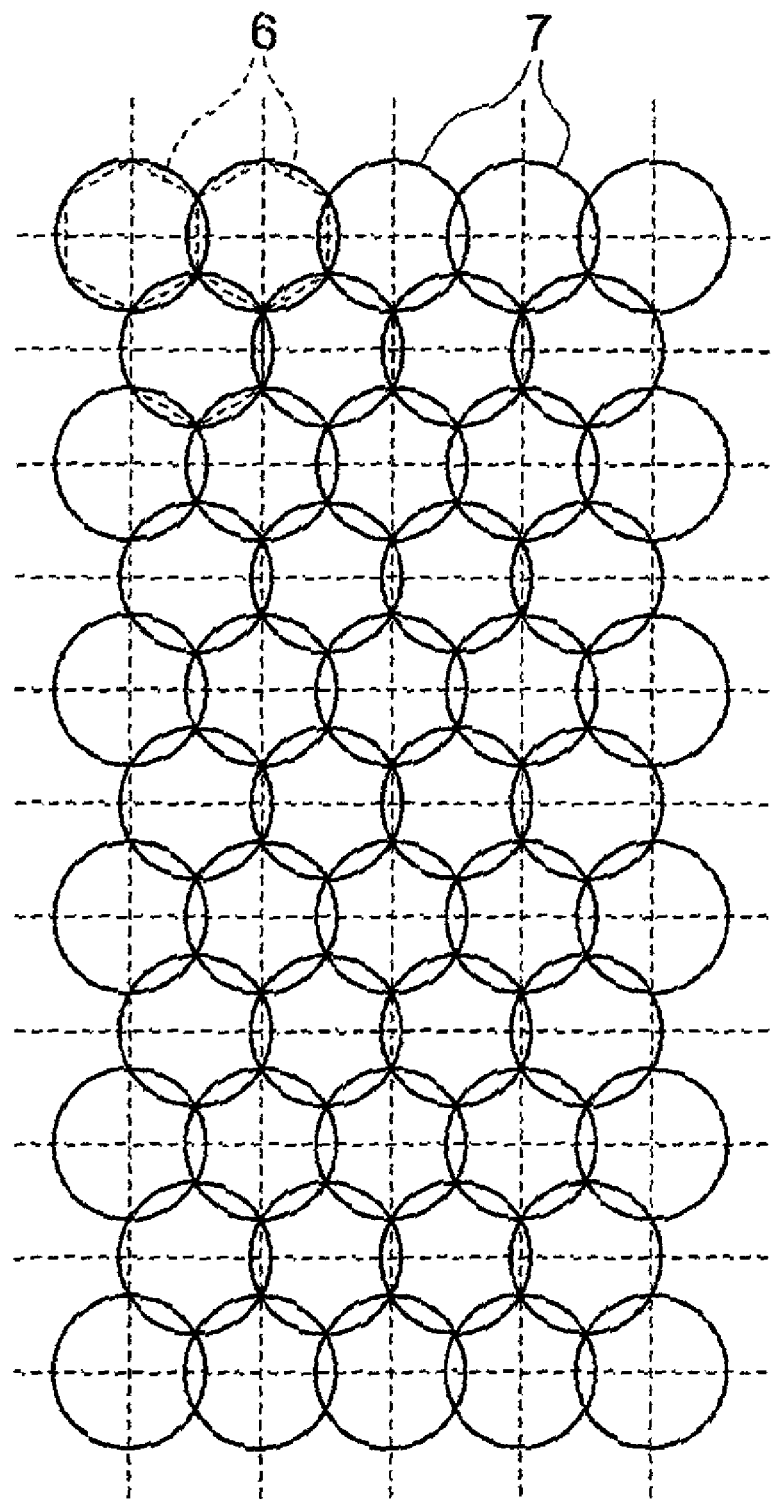
FIG. 6 A diagram illustrating a basic circular cell layout of the satellite communication system according to Embodiment 1 of the present invention.
Figure 7:
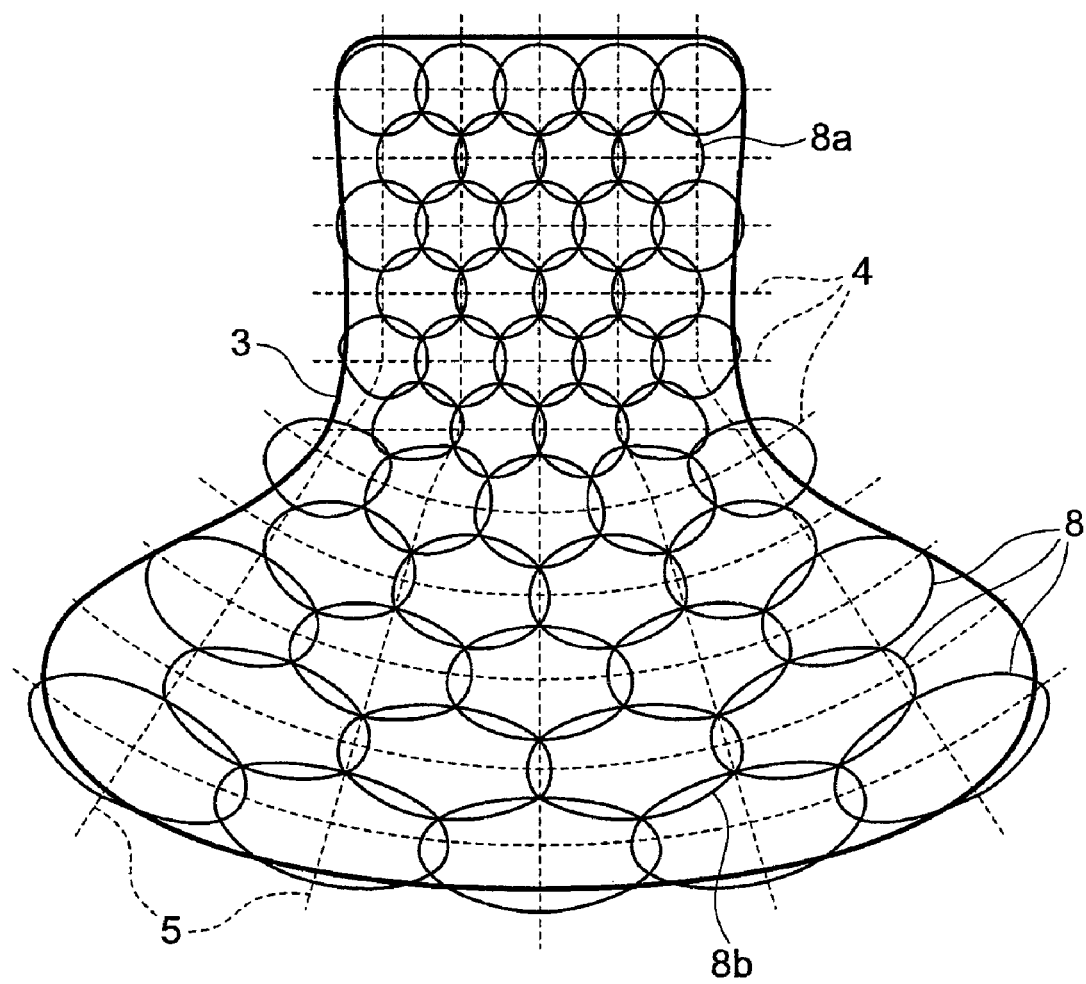
FIG. 7 A diagram illustrating a post-coordinate transformation cell layout of the satellite communication system according to Embodiment 1 of the present invention.

FIG. 4 is a diagram illustrating an example of a coverage area and coordinate grid of the satellite communication system according to Embodiment 1 of the present invention. FIGS. 5 and 6 are diagrams illustrating basic cell layouts of the satellite communication system according to Embodiment 1 of the present invention. FIG. 7 is a diagram illustrating a post-coordinate transformation cell layout of the satellite communication system according to Embodiment 1 of the present invention.

FIG. 4 is an example of a coverage area 3 defined in Step 301 and of a coordinate grid defined in Step 302. Shown in the figure are curves (dashed lines) 4 (curves in which u is constant) and 5 (curves in which v is constant) which are each obtained by changing only one of two defining parameters, u and v. The defined coordinate system has a grid pattern similar to that of the Cartesian coordinate system (x-y coordinate system) around the origin of coordinates and, in the quadrants of the post-transformation coordinate system where values of the y' axis are negative (lower part), the grid pattern is combined with a coordinate system similar to the polar coordinate system.

FIG. 5 illustrates the layout of basic cells 6 which are regular hexagons (solid lines) and created in Step 303. Dashed lines that circumscribe the regular hexagons represent basic cells 7, which are circular.

FIG. 6 illustrates circles that circumscribe and replace the regular hexagons of FIG. 5. Cells of FIG. 5 and cells of FIG. 6 may each be employed as basic cells. The basic cells may be distorted by arbitrarily expanding or shrinking the layout of FIG. 5 or FIG. 6 lengthwise and crosswise, or by slanting the entire layout.

FIG. 7 illustrates a new cell layout obtained by the coordinate transformation in Step 304. The upper part is a grid pattern coordinate system and is equal to the basic cell layout created in Step 303 (for example, cells 8a). The lower part of the post-transformation coordinate system, on the other hand, is a coordinate system similar to the polar coordinate system which has an increased coordinate grid interval, and therefore is larger in cell size (for example, cells 8b). Both types of cells are placed on a coordinate grid through the transformation and maintain the adjacency relation in which six cells are arranged around one cell.

EMBODIMENT 2

A description is given on coordinate transformation in a coverage area dividing method of a satellite communication system according to Embodiment 2 of the present invention.

While Embodiment 1 above uses common coordinate transformation between coordinate systems, Embodiment 2 uses coordinate transformation between orthogonal coordinate systems. Coordinate transformation formulae for converting one orthogonal coordinate system to another orthogonal coordinate system are well known, and the conversion is easily accomplished. Examples of the orthogonal coordinate transformation include a conversion from a Cartesian coordinate system to a polar coordinate system, a conversion from a Cartesian coordinate system to an elliptic coordinate system, a conversion from a Cartesian coordinate system to a parabolic coordinate system, and a conversion from a Cartesian coordinate system to a bipolar coordinate system.

EMBODIMENT 3

Figure 8:
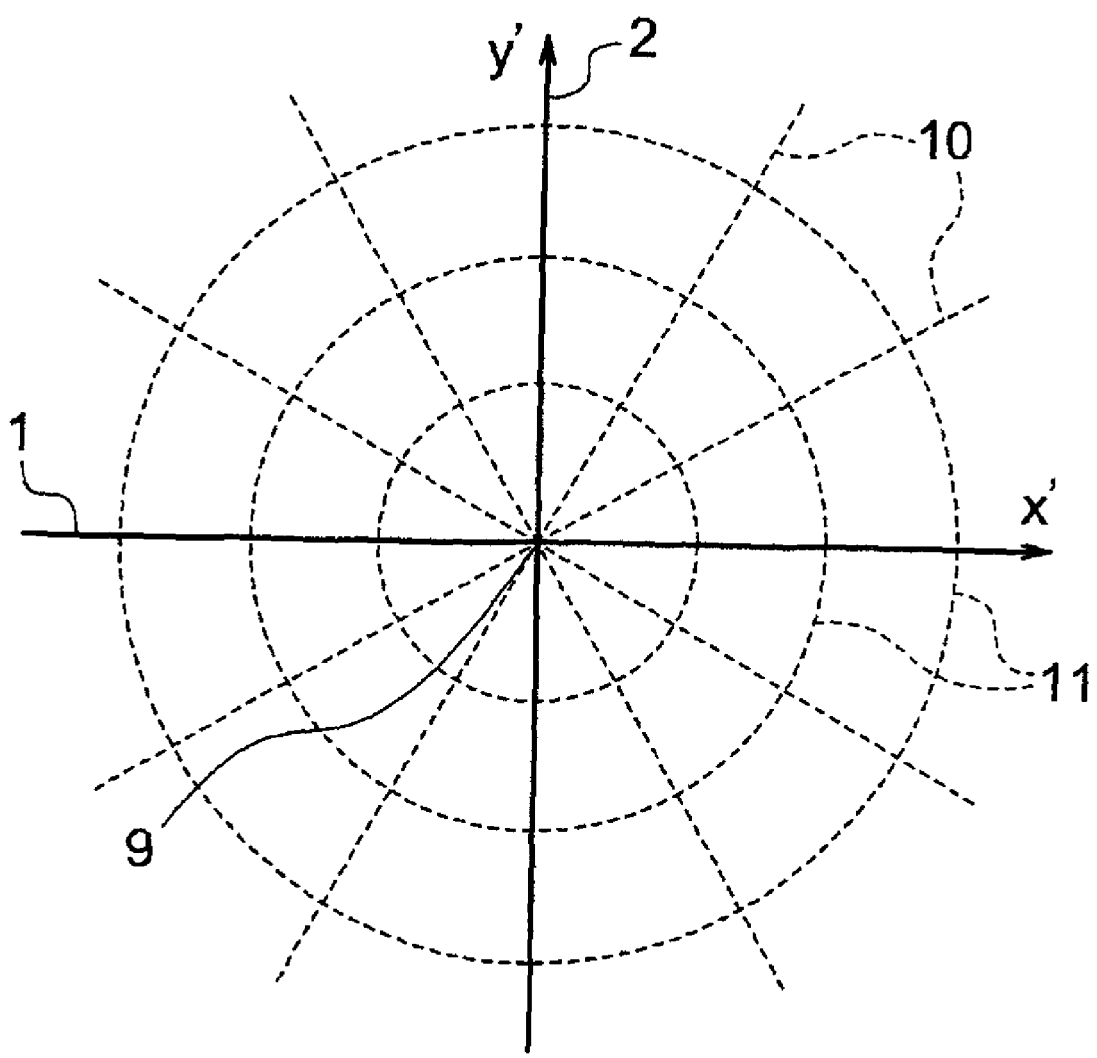
FIG. 8 A diagram illustrating a polar coordinate system in a coverage area dividing method of a satellite communication system according to Embodiment 3 of the present invention.
Figure 9:
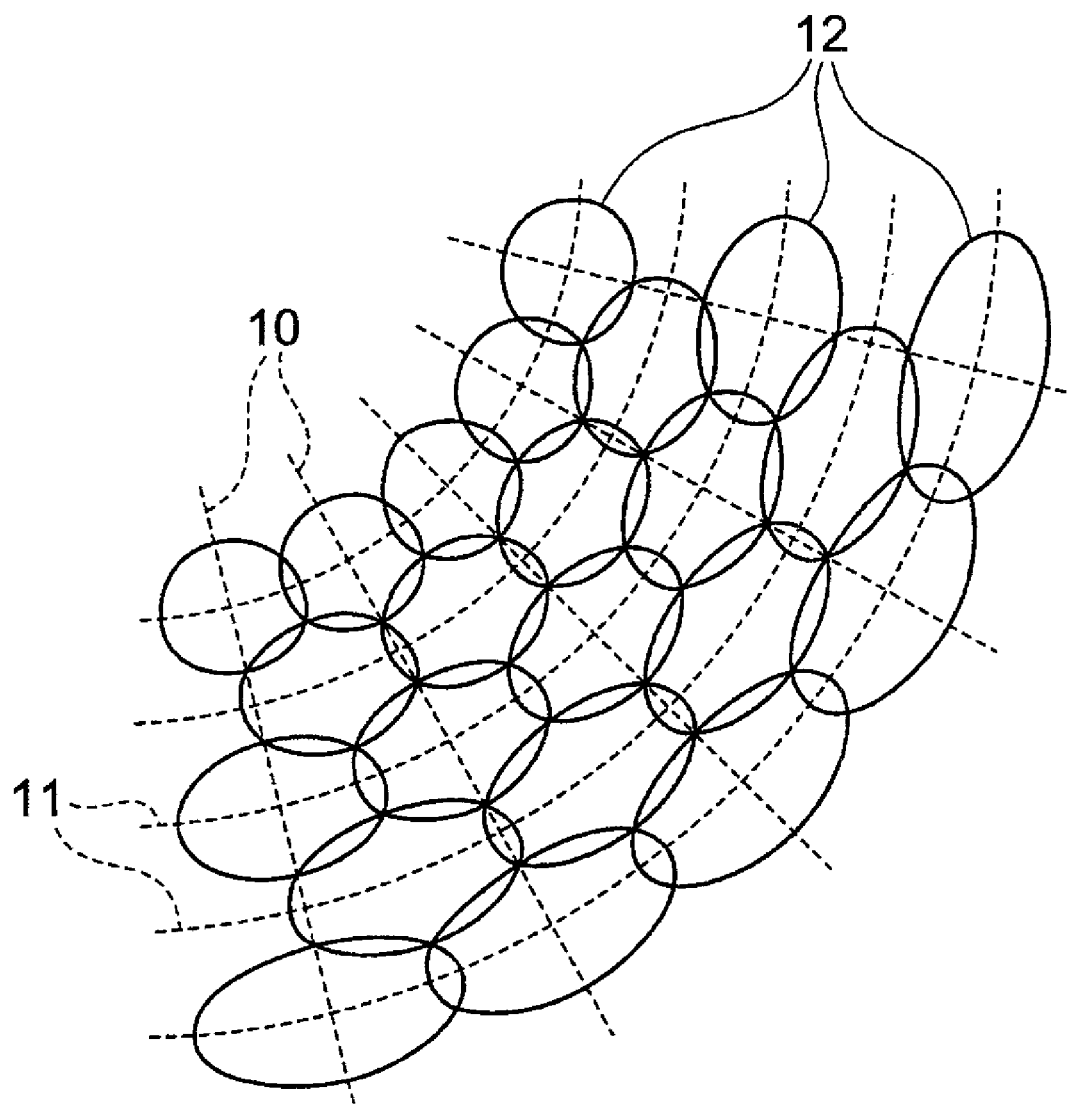
FIG. 9 A diagram illustrating a post-coordinate transformation cell layout of the satellite communication system according to Embodiment 3 of the present invention.

A description is given with reference to FIGS. 8 and 9 on coordinate transformation in a coverage area dividing method of a satellite communication system according to Embodiment 3 of the present invention. FIG. 8 is a diagram illustrating a polar coordinate system in the coverage area dividing method of the satellite communication system according to Embodiment 3 of the present invention.

In the polar coordinate system of FIG. 8, half-lines 10 in which $\theta$ is constant radiate from a pole 9, and curves 11 in which r is constant form concentric circles about the pole 9.

The relation between the Cartesian coordinate system (x-y coordinate system) and the polar coordinate system of FIG. 8 is expressed by the following Expressions (1) and (2):

$$x = r \cdot \cos \theta \tag{1}$$

$$y = r \cdot \sin \theta \tag{2}$$

FIG. 9 is a diagram illustrating a post-coordinate transformation cell layout of the satellite communication system according to Embodiment 3 of the present invention.

FIG. 9 is a result of converting the basic cell layout by changing $\theta$ to $\beta x$ and changing r to $\alpha y$. When (x, y) is given as the coordinates of the border between basic cells and (x', y') is given as the coordinates of the border between post-coordinate transformation cells, the relation between the two is expressed by the following Expressions (3) and (4), where $\alpha$ and $\beta$ represent transformation coefficients. Transformation coefficients suitable for the objective cell shape may be chosen.

$$x' = \alpha y \cdot \cos \beta x \tag{3}$$

$$y' = \beta y \cdot \sin \beta x \tag{4}$$

The figure shows that the cell size is smaller as the distance from the pole 9 decreases and grows larger as the distance from the pole 9 increases. On the other hand, the relation in which one cell has six adjacent cells is maintained and the frequency reuse pattern in the basic cells can therefore be used. An arbitrary basic cell layout may be used and, in this case, too, the adjacency relation of the basic cell layout is maintained throughout coordinate transformation. The coordinate transformation of Embodiment 3 gives the same shape to cells on the curves 11 of the polar coordinate system where r is constant, and is effective when cells that are identical to one another are used in the circumferential direction.

EMBODIMENT 4

Figure 10:
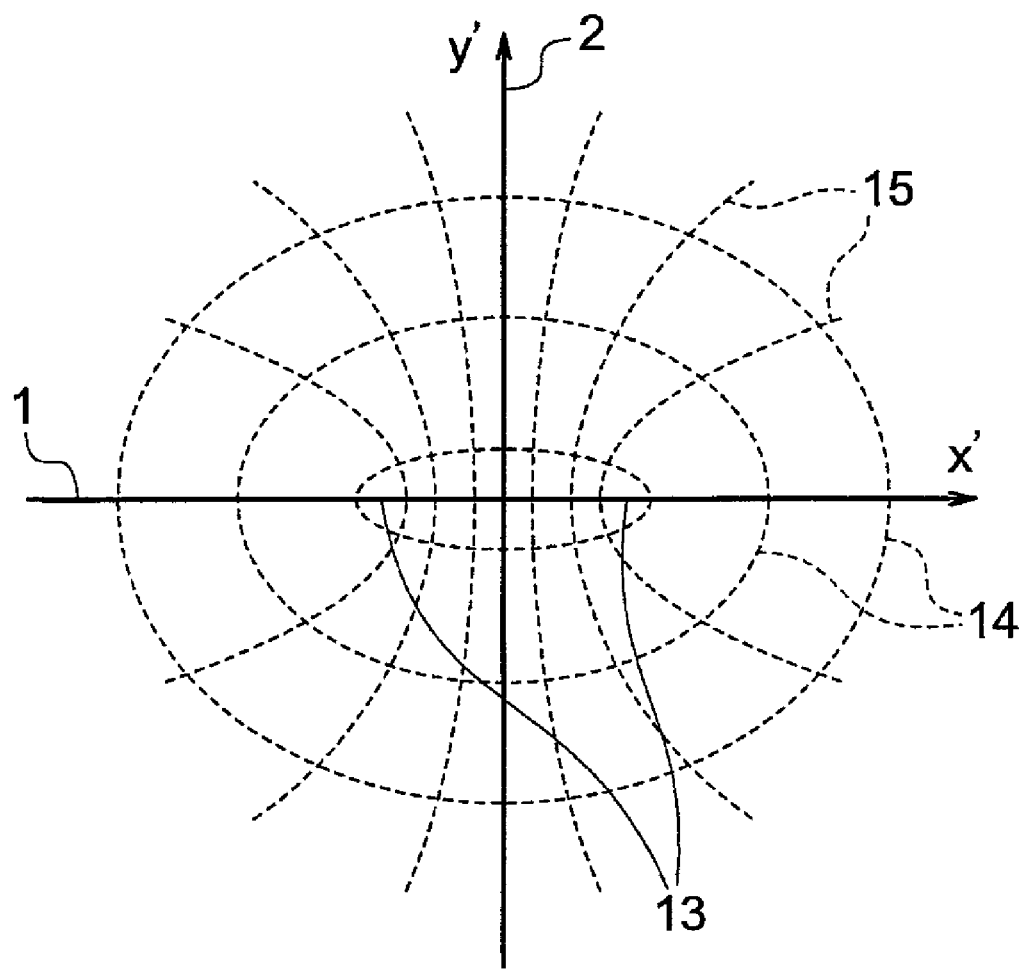
FIG. 10 A diagram illustrating an elliptic coordinate system in a coverage area dividing method of a satellite communication system according to Embodiment 4 of the present invention.
Figure 11:
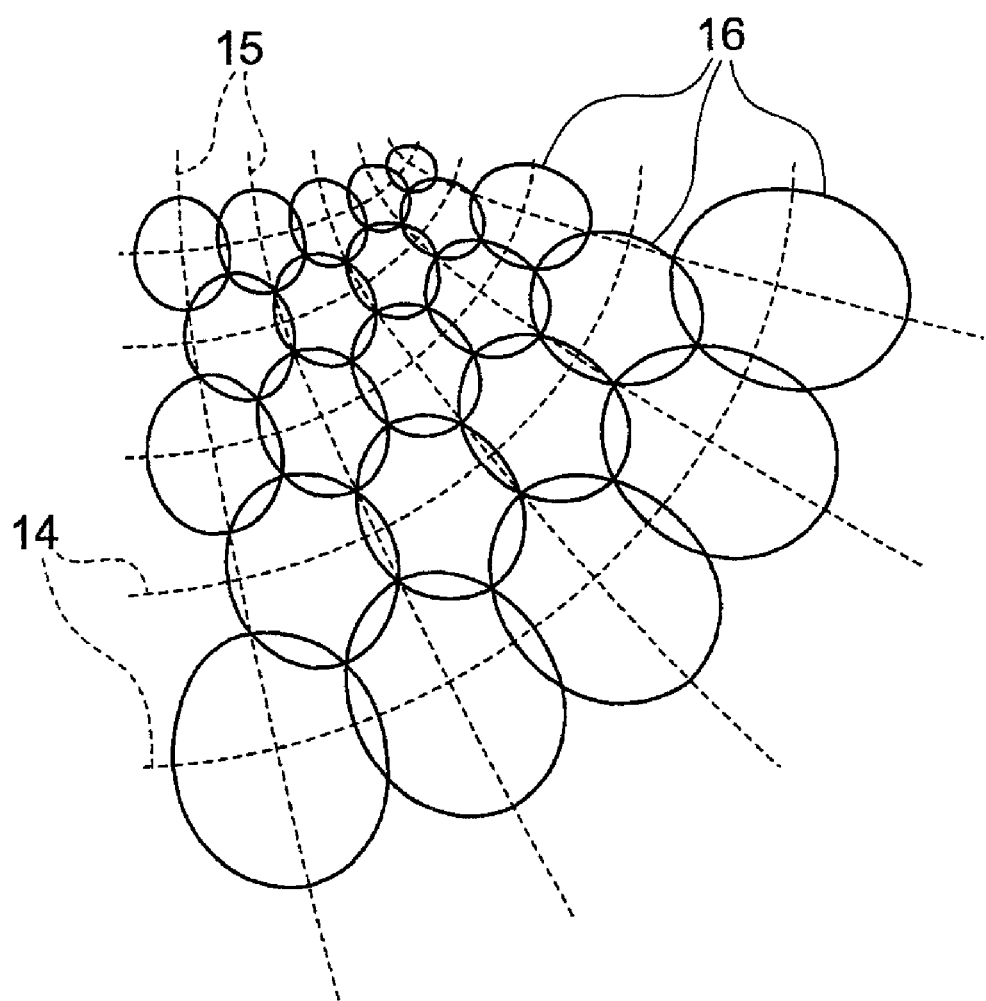
FIG. 11 A diagram illustrating a post-coordinate transformation cell layout of the satellite communication system according to Embodiment 4 of the present invention.

A description is given with reference to FIGS. 10 and 11 on coordinate transformation in a coverage area dividing method of a satellite communication system according to Embodiment 4 of the present invention. FIG. 10 is a diagram illustrating an elliptic coordinate system in the coverage area dividing method of the satellite communication system according to Embodiment 4 of the present invention.

FIG. 10 illustrates the elliptic coordinate system that is an orthogonal coordinate system expressed by two parameters, u and v. The coordinate system is constituted of ellipses (curves 14 in which u is constant) that have foci 13 at points expressed by x'=±A, and hyperbolic curves (curves 15 in which v is constant).

The relation between the Cartesian coordinate system and the elliptic coordinate system of FIG. 10 is expressed by the following Expressions (5) and (6):

$$x = A \cdot \cos hu \cdot \cos v \tag{5}$$

$$y = A \cdot \sin hu \cdot \sin v \tag{6}$$

FIG. 11 is a diagram illustrating a post-coordinate transformation cell layout of the satellite communication system according to Embodiment 4 of the present invention.

FIG. 11 is a result of converting the basic cell layout by changing v to βx and changing u to βy. When (x, y) is given as the coordinates of the border between basic cells and (x', y') is given as the coordinates of the border between post-coordinate transformation cells, the relation between the two is expressed by the following Expressions (7) and (8), where α and β represent transformation coefficients. Transformation coefficients suitable for the objective cell shape may be chosen.

$$x' = A \cdot \cos h\alpha y \cdot \cos \beta x \quad (7)$$

$$y' = A \cdot \sin h\alpha y \cdot \sin \beta x \quad (8)$$

The figure shows that the cell size is smaller as the distance from the foci 13 decreases and grows larger as the distance from the foci 13 increases. The relation in which one cell has six adjacent cells is maintained and the frequency reuse pattern in the basic cells can therefore be used. An arbitrary basic cell layout may be used and, in this case, too, the adjacency relation of the basic cell layout is maintained throughout coordinate transformation. In the coordinate transformation of Embodiment 4, cells on the curves 14 in which u is constant do not have the same shape in areas close to the foci 13, and the cell shape is approximately the same in the circumferential direction in areas distant from the foci 13. This is effective when a local conversion to small cells is desired.

EMBODIMENT 5

Figure 12:
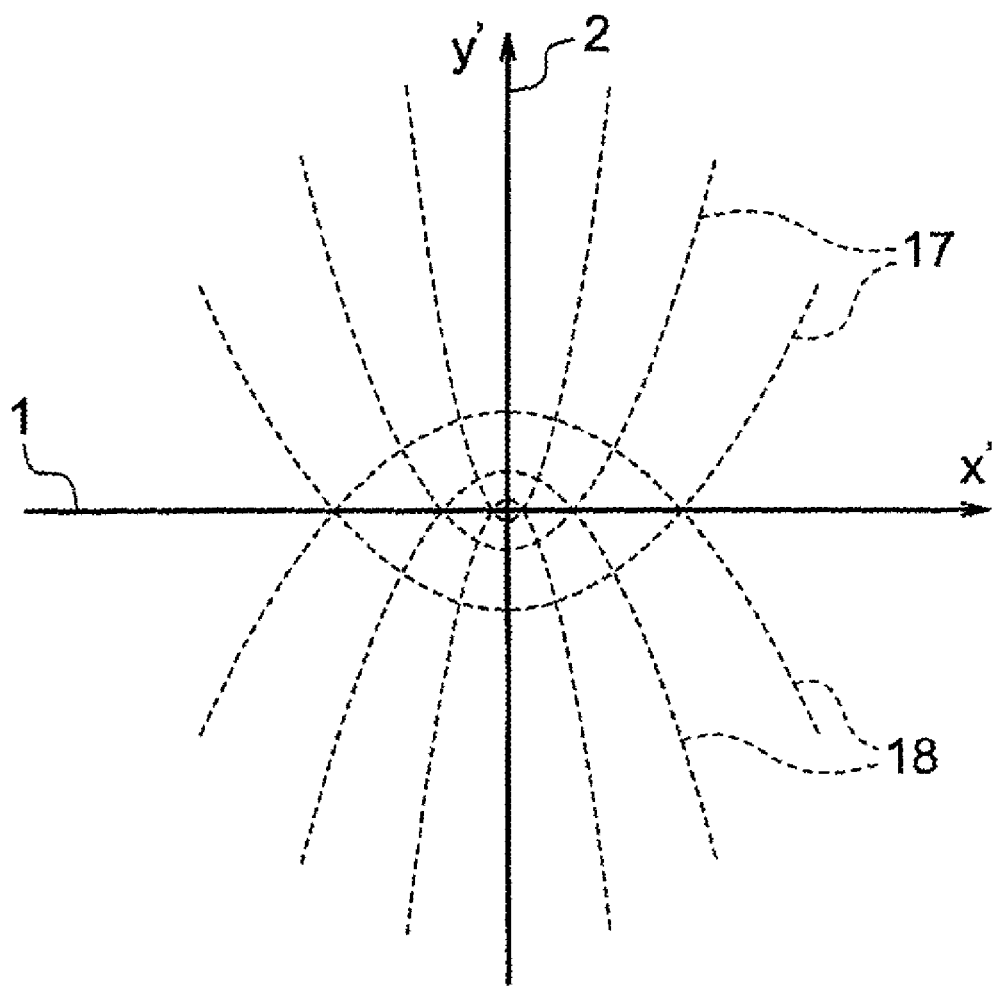
FIG. 12 A diagram illustrating a parabolic coordinate system in a coverage area dividing method of a satellite communication system according to Embodiment 5 of the present invention.
Figure 13:
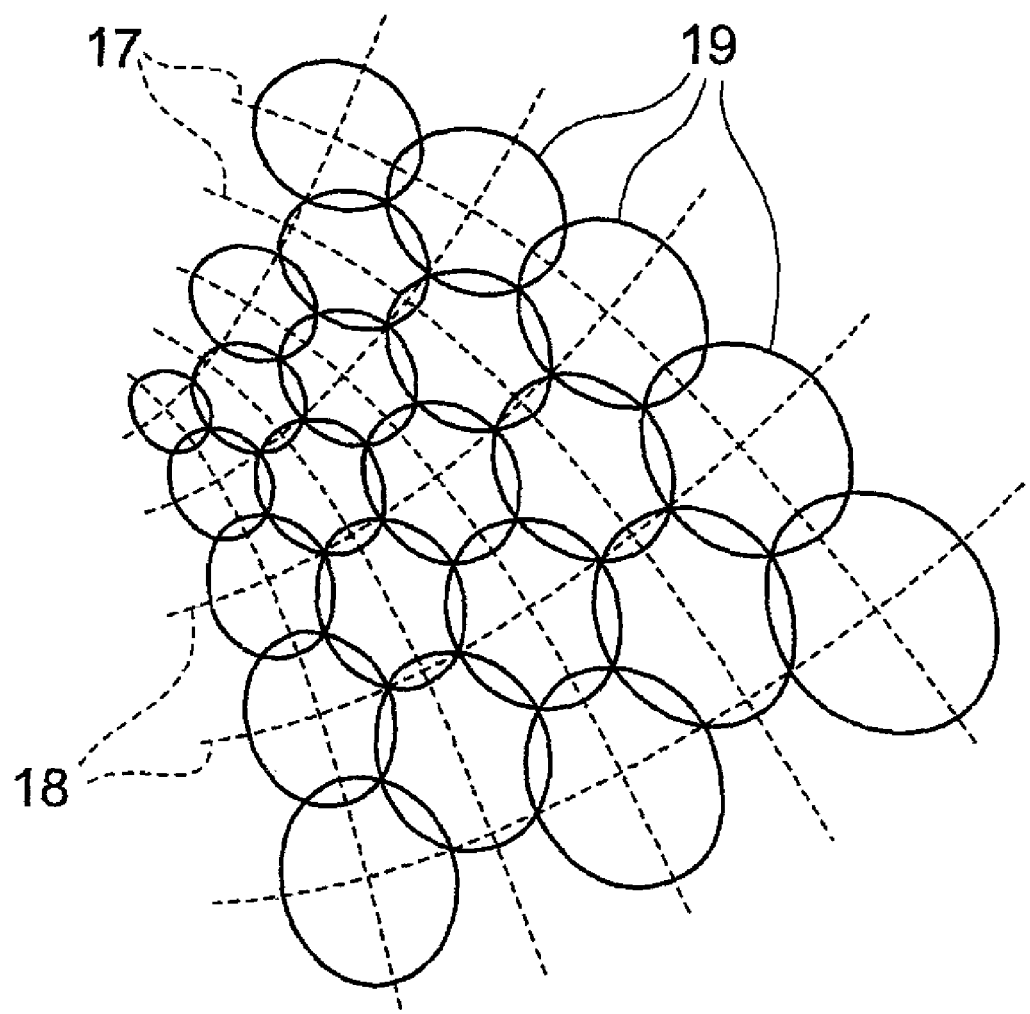
FIG. 13 A diagram illustrating a post-coordinate transformation cell layout of the satellite communication system according to Embodiment 5 of the present invention.

A description is given with reference to FIGS. 12 and 13 on coordinate transformation in a coverage area dividing method of a satellite communication system according to Embodiment 5 of the present invention. FIG. 12 is a diagram illustrating a parabolic coordinate system in the coverage area dividing method of the satellite communication system according to Embodiment 5 of the present invention.

FIG. 12 illustrates the parabolic coordinate system that is an orthogonal coordinate system expressed by two parameters, u and v. The coordinate system is constituted of two groups of parabolas (curves 18 in which u is constant and curves 17 in which v is constant).

The relation between the Cartesian coordinate system and the parabolic coordinate system of FIG. 12 is expressed by the following Expressions (9) and (10):

$$x = u \cdot v \quad (9)$$

$$y = (u2 - v2)/2 \quad (10)$$

FIG. 13 is a diagram illustrating a post-coordinate transformation cell layout of the satellite communication system according to Embodiment 5 of the present invention.

FIG. 13 is a result of converting the basic cell layout by changing v to βx and changing u to αy. When (x, y) is given as the coordinates of the border between basic cells and (x', y') is given as the coordinates of the border between post-coordinate transformation cells, the relation between the two is expressed by the following Expressions (11) and (12), where α and β represent transformation coefficients. Transformation coefficients suitable for the objective cell shape may be chosen.

$$x' = \alpha x \cdot \beta y \quad (11)$$

$$y' = ((\alpha y)2 - (\beta x)2)/2 \quad (12)$$

The figure shows that the cell size is smaller in areas in which u and v are smaller and grows larger in areas in which u and v are larger. The relation in which one cell has six adjacent cells is maintained and the frequency reuse pattern in the basic cells can therefore be used. An arbitrary basic cell layout may be used and, in this case, too, the adjacency relation of the basic cell layout is maintained throughout coordinate transformation. The coordinate transformation of Embodiment 5 makes the shift in cell size approximately uniform, and is effective when a smooth shift in cell size is desired.

EMBODIMENT 6

Figure 14:
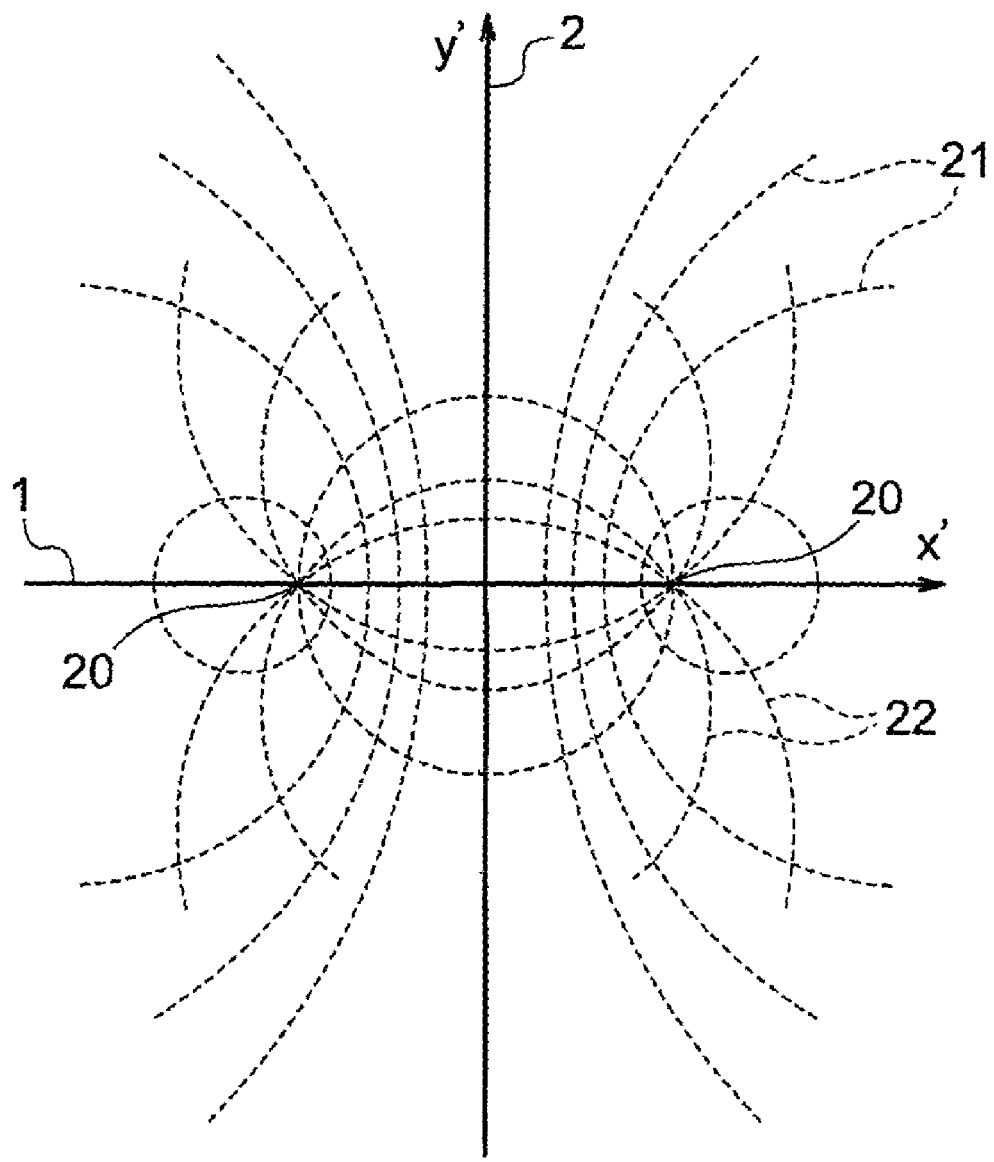
FIG. 14 A diagram illustrating a bipolar coordinate system in a coverage area dividing method of a satellite communication system according to Embodiment 6 of the present invention.
Figure 15:
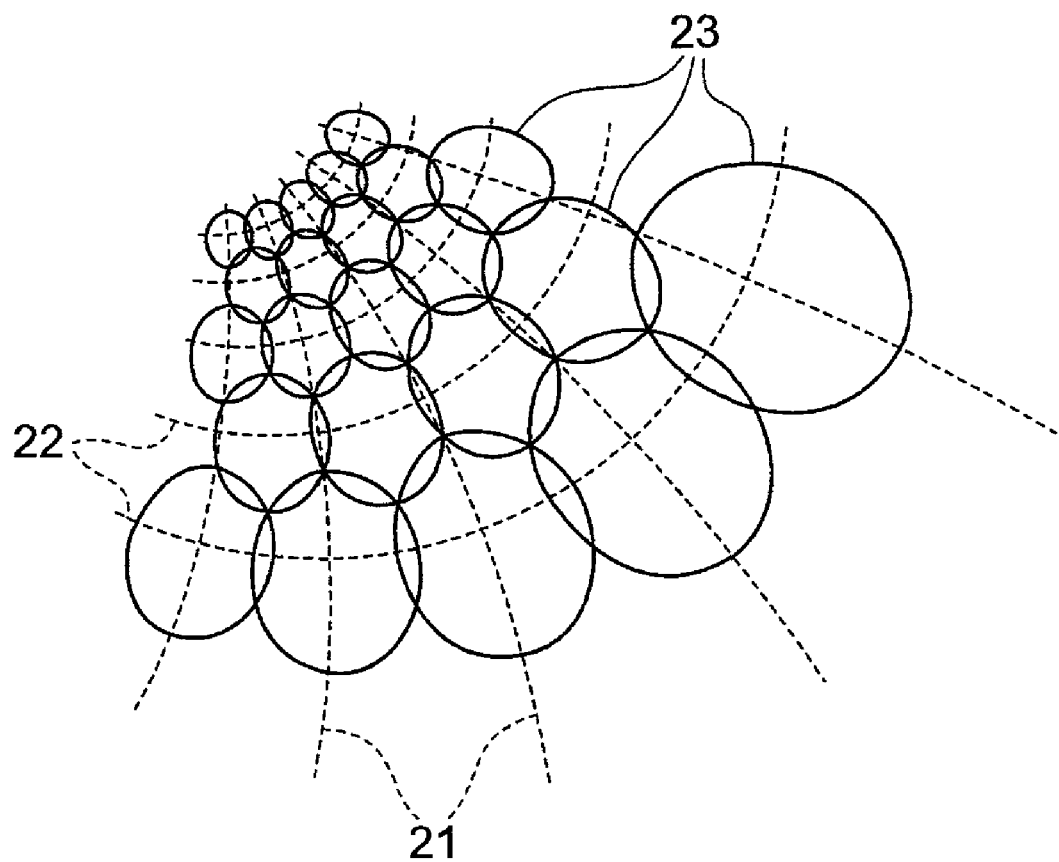
FIG. 15 A diagram illustrating a post-coordinate transformation cell layout of the satellite communication system according to Embodiment 6 of the present invention.

A description is given with reference to FIGS. 14 and 15 on coordinate transformation in a coverage area dividing method of a satellite communication system according to Embodiment 6 of the present invention. FIG. 14 is a diagram illustrating a bipolar coordinate system in the coverage area dividing method of the satellite communication system according to Embodiment 6 of the present invention.

FIG. 14 illustrates the bipolar coordinate system that is an orthogonal coordinate system expressed by two parameters, u and v. The coordinate system has two poles 20, and is constituted of curves that surround the respective poles 20 (curves 21 in which u is constant) and curves that connect the two poles (curves 22 in which v is constant).

The relation between the Cartesian coordinate system and the bipolar coordinate system of FIG. 14 is expressed by the following Expressions (13) and (14):

$$x = A \cdot \sin hu/(\cos hu - \cos v) \quad (13)$$

$$y = A \cdot \sin v/(\cos hu - \cos v) \quad (14)$$

FIG. 15 is a diagram illustrating a post-coordinate transformation cell layout of the satellite communication system according to Embodiment 6 of the present invention.

FIG. 15 is a result of converting the basic cell layout by changing v to βx and changing u to αy. When (x, y) is given as the coordinates of the border between basic cells and (x', y') is given as the coordinates of the border between post-coordinate transformation cells, the relation between the two is expressed by the following Expressions (15) and (16), where α and β represent transformation coefficients. Transformation coefficients suitable for the objective cell shape may be chosen.

$$x' = A \cdot \sin h\alpha y/(\cos h\alpha y - \cos \beta x) \quad (15)$$

$$y' = A \cdot \sin \beta x/(\cos h\alpha y - \cos \beta x) \quad (16)$$

The figure shows that the cell size is smaller as the distance from the poles 20 decreases and grows larger as the distance from the poles 20 increases. The relation in which one cell has six adjacent cells is maintained and the frequency reuse pattern in the basic cells can therefore be used. An arbitrary basic cell layout may be used and in this case, too, the adjacency relation of the basic cell layout is maintained throughout coordinate transformation. The coordinate transformation of Embodiment 6 makes the cell size extremely small around the two poles 20, and therefore is effective when a great difference in cell size is desired.

REFERENCE SIGNS LIST

1 x' axis, 2 y' axis, 3 coverage area, 4 curve in which u is constant, 5 curve in which v is constant, 6 basic regular hexagon cell, 7 basic circular cell, 8 new cell (converted cell), 8a post-transformation small cell, 8b post-transformation large cell, 9 pole, 10 half-line in which θ is constant, 11 curve in which r is constant (concentric circle), 12 converted cell, 13 focus, 14 curve in which u is constant, 15 curve in which v is constant, 16 converted cell, 17 curve in which u is constant, 18 curve in which v is constant, 19 converted cell, 20 pole, 21 curve in which u is constant, 22 curve in which v is constant, 23 converted cell, 100 satellite, 101 beam forming apparatus, 102 antenna device, 110 beam, 200 earth station

The invention claimed is:

1. A satellite communication system for communications between a satellite and a plurality of earth stations,
   wherein the satellite comprises:
   a beam forming apparatus for forming a plurality of beams in respective directions of cells into which a coverage area as a communication target area is divided; and
   a plurality of antenna devices connected to the beam forming apparatus, and
   wherein the beam forming apparatus is configured to:
   define a perimeter of the coverage area, and define a coordinate grid of a second coordinate system so as to divide the coverage area into a plurality of small areas;
   calculate coordinates of borders between basic cells in a first coordinate system, the basic cells being shaped into regular hexagons arranged to be in contact with one another along their sides and at their vertices or into circles circumscribing the regular hexagons;
   define a plurality of new cells by converting, through coordinate transformation, the coordinates of the borders between the basic cells in the first coordinate system into coordinates of borders in the second coordinate system; and
   set amplitudes and phases to the plurality of antenna devices that are suitable to form the plurality of beams in respective directions of the plurality of new cells.

2. A satellite communication system according to claim 1,
   wherein the first coordinate system is a first orthogonal coordinate system, and
   wherein the second coordinate system is a second orthogonal coordinate system.

3. A satellite communication system according to claim 1,
   wherein the first coordinate system is a Cartesian coordinate system, and
   wherein the second coordinate system is a polar coordinate system.

4. A satellite communication system according to claim 1,
   wherein the first coordinate system is a Cartesian coordinate system, and
   wherein the second coordinate system is an elliptic coordinate system.

5. A satellite communication system according to claim 1,
   wherein the first coordinate system is a Cartesian coordinate system, and
   wherein the second coordinate system is a parabolic coordinate system.

6. A satellite communication system according to claim 1,
   wherein the first coordinate system is a Cartesian coordinate system, and
   wherein the second coordinate system is a bipolar coordinate system.

7. A method of dividing a coverage area of a satellite communication system for communications between a satellite and a plurality of earth stations, the satellite comprising a beam forming apparatus and a plurality of antenna devices, the beam forming apparatus forming a plurality of beams in respective directions of cells into which the coverage area as a communication target area is divided, the plurality of antenna devices being connected to the beam forming apparatus,
   the method comprising:
   defining, by the beam forming apparatus, a perimeter of the coverage area;
   defining, by the beam forming apparatus, a coordinate grid of a second coordinate system so as to divide the coverage area into a plurality of small areas;
   calculating, by the beam forming apparatus, coordinates of borders between basic cells in a first coordinate system, the basic cells being shaped into regular hexagons arranged to be in contact with one another along their sides and at their vertices or into circles circumscribing the regular hexagons; and
   defining, by the beam forming apparatus, a plurality of new cells by converting, through coordinate transformation, the coordinates of the borders between the basic cells in the first coordinate system into coordinates of borders in the second coordinate system.

8. A method of dividing a coverage area according to claim 7,
   wherein the first coordinate system is a first orthogonal coordinate system, and
   wherein the second coordinate system is a second orthogonal coordinate system.

9. A method of dividing a coverage area according to claim 7,
   wherein the first coordinate system is a Cartesian coordinate system, and
   wherein the second coordinate system is a polar coordinate system.

10. A method of dividing a coverage area according to claim 7,
    wherein the first coordinate system is a Cartesian coordinate system, and
    wherein the second coordinate system is an elliptic coordinate system.

11. A method of dividing a coverage area according to claim 7,
    wherein the first coordinate system is a Cartesian coordinate system, and
    wherein the second coordinate system is a parabolic coordinate system.

12. A method of dividing a coverage area according to claim 7,
    wherein the first coordinate system is a Cartesian coordinate system, and
    wherein the second coordinate system is a bipolar coordinate system.

* * * * *